Aug. 5, 1969  F. G. RICHTER ET AL  3,460,147
AMPLITUDE MODE DOPPLER DIRECTION FINDER
Filed Dec. 11, 1967  6 Sheets-Sheet 5

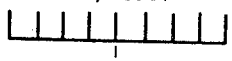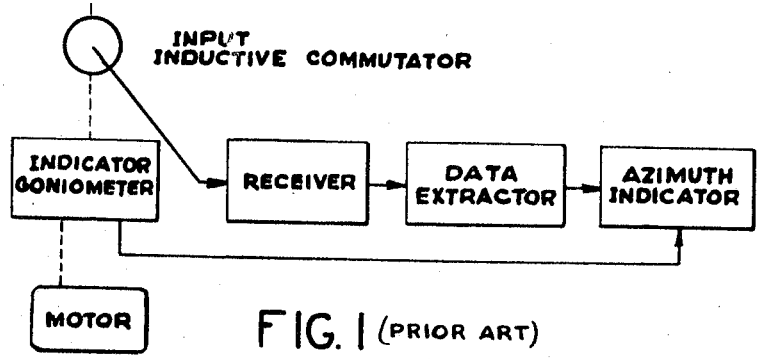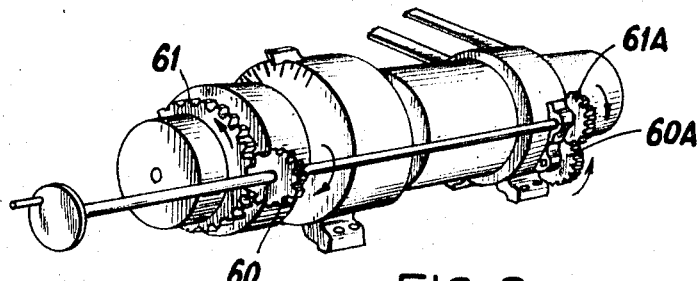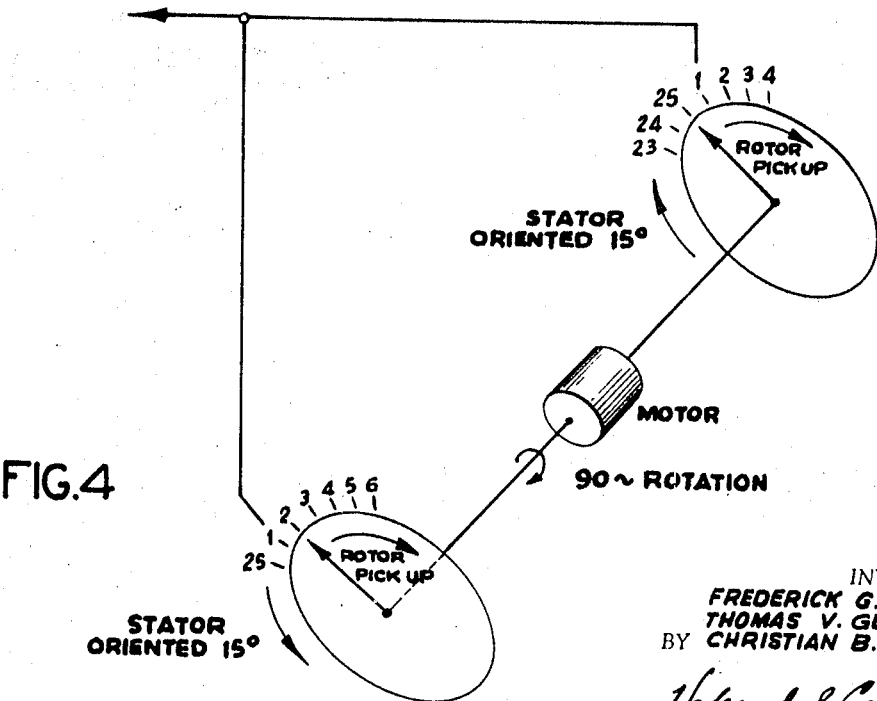

|  | NO RF SIGNAL | DOPPLER NORTH ARRIVING | DOPPLER EAST ARRIVING | AMPLITUDE MODE NORTH ARRIVING |
|---|---|---|---|---|
| DF SIGNAL | — | 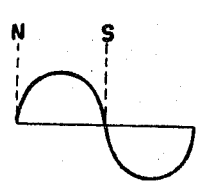 | 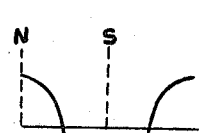 | 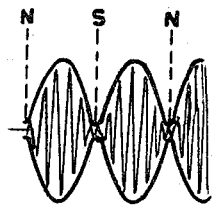 |
| DETECTED CUSP | — |  |  |  |
| 72 KC MODULATOR OUTPUT |  | 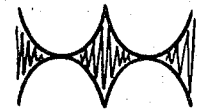 | 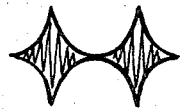 | 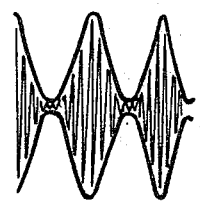 |
| GONIO VERT. OUTPUT | 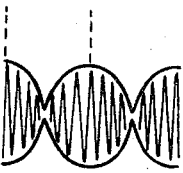 |  |  | 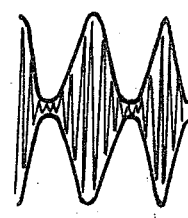 |
| GONIO HORIZ. OUTPUT | 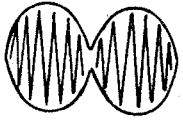 |  |  | 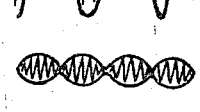 |
| CRT PATTERN (UNSENSED) | 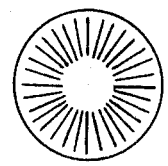 | 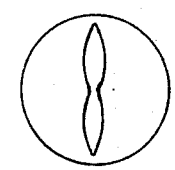 | 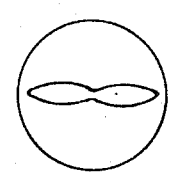 | 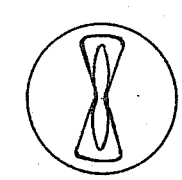 |

FIG. 7

INVENTORS
FREDERICK G. RICHTER
THOMAS V. GUERRIERE
BY CHRISTIAN B. WILLIAMS

Hopgood & Calimafde
ATTORNEYS

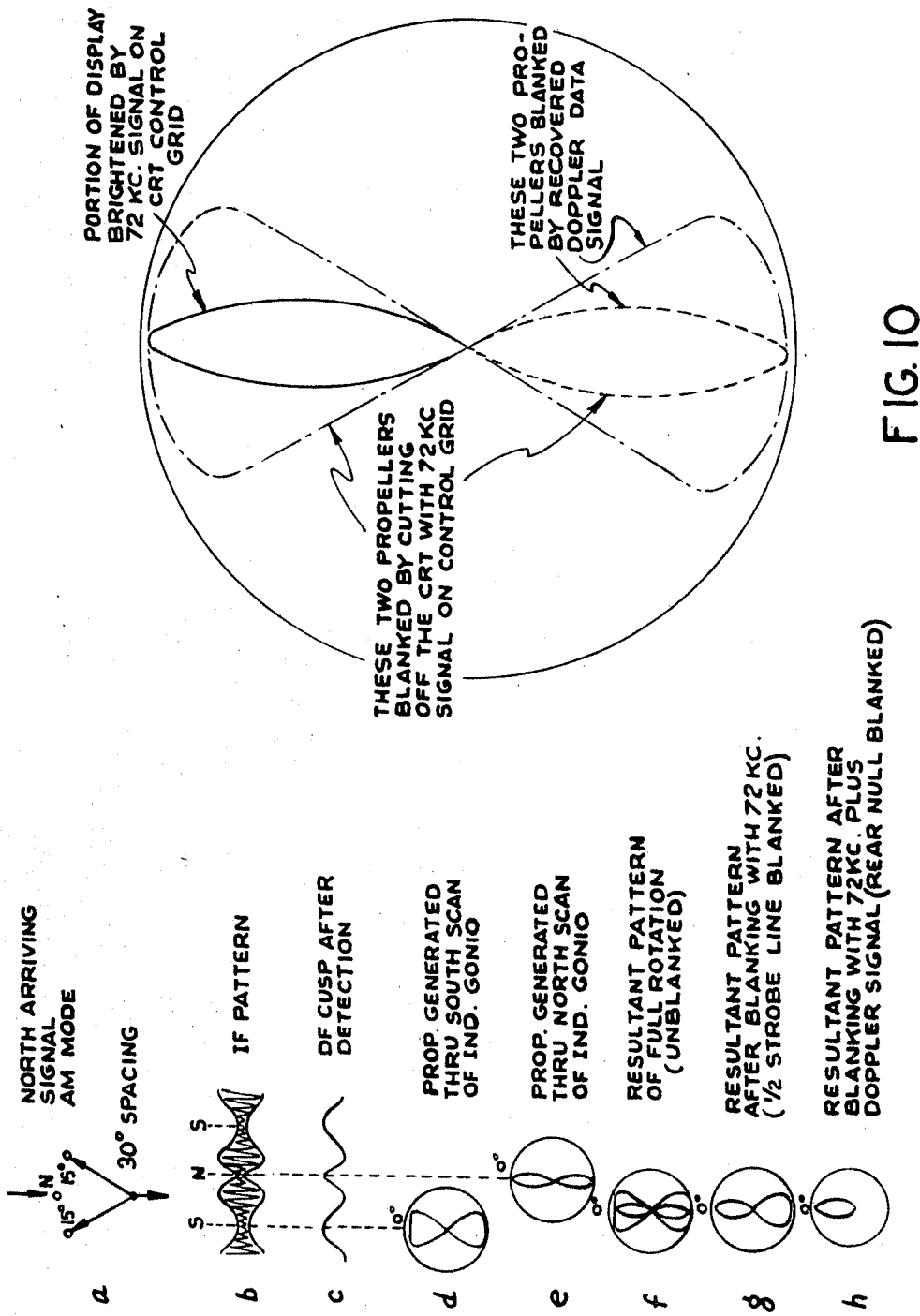

United States Patent Office 3,460,147
Patented Aug. 5, 1969

3,460,147
AMPLITUDE MODE DOPPLER DIRECTION FINDER
Frederick G. Richter, Huntington Station, Thomas V. Guerriere, Lake Grove, and Christian B. Williams, Stony Brook, N.Y., assignors to Servo Corporation of America, Hicksville, N.Y., a corporation of New York
Filed Dec. 11, 1967, Ser. No. 689,418
Int. Cl. G01s 5/02
U.S. Cl. 343—113                                5 Claims

ABSTRACT OF THE DISCLOSURE

This invention relates to a direction finder characterized by a simulated rotating antenna which operates in an amplitude mode. Two simulated rotating antennas are developed from a conventional Doppler array and have their outputs continuously differenced to obtain amplitude modulated bearing information. The rotational spacing of the antennas is continuously made adjustable to provide desired results.

---

This invention related to a Doppler direction finder operating in an amplitude mode.

Doppler direction finders utilizing the "rotating" antenna principle are well known and in general have provided superior performance in obtaining bearings on most types of signals transmitted in the H.F. spectrum.

One problem that has existed in connection with such Doppler direction finders occurs when transient disturbances are introduced into the DF data when phase or frequency modulated signals are processed. In general, the object of this inventon is to provide a direction finding system retaining the advantages of a Doppler direction finder but operating in an amplitude mode to improve performance on these types of signals.

Prior art systems

Radio direction finding, or the determination of the direction of arrival of a radio signal has been accomplished by one or two basic methods, Amplitude mode (Adcock direction finders) and Phase mode (Doppler direction finders).

Adcock system

The basic four element Adcock direction finder comprises an antenna array, consisting of four vertical monopole antennas arranged in pairs having a double figure eight directivity characteristic.

The north-south antennas have a figure eight pattern with maximum response to the north and south. The east-west antenna pair exhibit a figure eight pattern with maximum response in the east-west direction. To produce an effect equivalent to the rotation of a single pair of antennas, the outputs of the two figure eight antenna pairs are fed to two mutually perpendicularly stator coils in the goniometer. The antenna currents flowing through these two perpendicular coils set up a resultant RF field within the goniometer which corresponds to the direction of the wave front acting upon the fixed position figure eight antennas.

The goniometer contains a small rotor search coil, which exhibits a figure eight pattern as it is rotated. Rotation of the search coil in the goniometer is almost exactly equivalent to rotating a single pair of antennas.

Bearing information is determined by detection of the nulls imposed by this process on the received carrier signal. The detected nulls are referenced against the indicator goniometer in a azimuth indicator, and displayed as a double propeller pattern.

Due to physical limitations on the effective antenna aperture for Adcock systems, they are susceptible to site errors and have difficulty operating on signals which arrive at high angles of elevation.

Doppler system

The Doppler direction finder shown in FIG. 1 imposes a sinusoidal phase modulation on the carrier of the signal being received, and by comparison of the detected phase modulation against a reference signal, determines the azimuth angle of arrival. The antenna array comprises a plurality of monopole antennas equally spaced on the circumference of a circle. Each antenna is connected by a transmission line to an input primary transformer core of the inductive commutator. A rotating secondary transformer pickup core sequentially scans the input cores. This sampling process simulates the rotation of a single antenna about the circle of the antenna array and results in a phase modulation being imposed on the received carrier, with the phase of the modulation dependent upon the azimuth angle of arrival. The signal from the commutator is coupled to the receiver input. The IF output of the receiver is coupled to the data extractor where the IF signal is limited and the FM content detected. Appropriate filtering at the detector output removes the harmonics of the detected signal. The resulting sine wave is coupled to the azimuth indicator which is referenced by the indicator goniometer. Presentation of the detected phase modulation on the cathode-ray tube results in a propeller shaped display, which is continually sensed and indicates the azimuth angle of arrival.

This system performs well on all amplitude modulated signals, but is subject to disturbances by phase or frequency modulated signals. Carrier borne frequency or phase modulation will appear at the output of the detector as well as the DF impressed modulation and cause a bearing disturbance.

An object of this invention is to provide a DF mode of operation of the Doppler system to eliminate these disturbances.

Another object of this invention is to provide a system which operates in the amplitude mode but which is less susceptible to site errors.

A further object of this invention is to provide an improved direction finding system for operation with signals arriving at high angles of elevation.

Still another object of this invention is to provide an amplitude mode direction finding system using two simulated rotating antennas and for variably controlling the angular spacing between antennas to provide an adjustable wide aperture system.

A further object of this invention is to provide an amplitude mode direction finding system in which the wide aperture advantages of the Doppler system are retained.

Yet another object of this invention is to provide an amplitude mode and a Doppler mode direction finding system in which both modes of operation are instantaneously available at the discretion of the operator by use of appropriate switching means.

Briefly, amplitude mode operation on a Doppler antenna array is achieved by sequentially differencing two antennas, and obtaining azimuth-dependent nulls. Since the Doppler antenna array together with the inductive commutator simulates the rotation of a single antenna about the circle of the array at the angular rotation rate of the commutator rotor, providing an additional pickup coil and output simulates a second antenna.

During the rotation cycle, if the plane of the two antennas is perpendicular to the direction of wave propagation, the voltage induced in each antenna is equal in phase and magnitude, and differencing the two outputs results in a cancellation of signal or the characteristic null of amplitude mode radio direction finders. In this invention, the two simulated antennas may be set at any angular orientation up to 180° so that combined outputs representing the AM component which contains bearing information may be adjusted for optimum aperture. The relationship between the two simulated antennas is therefore controlled to provide effective performance. In an aspect of this invention, it is found that a Doppler bearing information signal is still present during amplitude mode operation. This signal is used to eliminate an ambiguity in the display from the detected amplitude mode signal to provide positive unambiguous sense.

The above mentioned and other features and objects of this invention and the manner of attaining them will become more apparent and the invention itself will best be understood by reference to the following description of embodiments of the invention taken in conjunction with the accompanying drawings wherein:

FIGURE 1 is a block diagram of a basic Doppler direction finder;

FIGURE 3 is a diagram of a dual commutator having variable rotor spacing means;

FIGURE 4 is a diagram of the dual commutator;

FIGURE 7 is a series of waveforms illustrating the modulated goniometer output and the resulting display;

FIGURES 8 through 10 are waveform diagrams.

Figure 2:
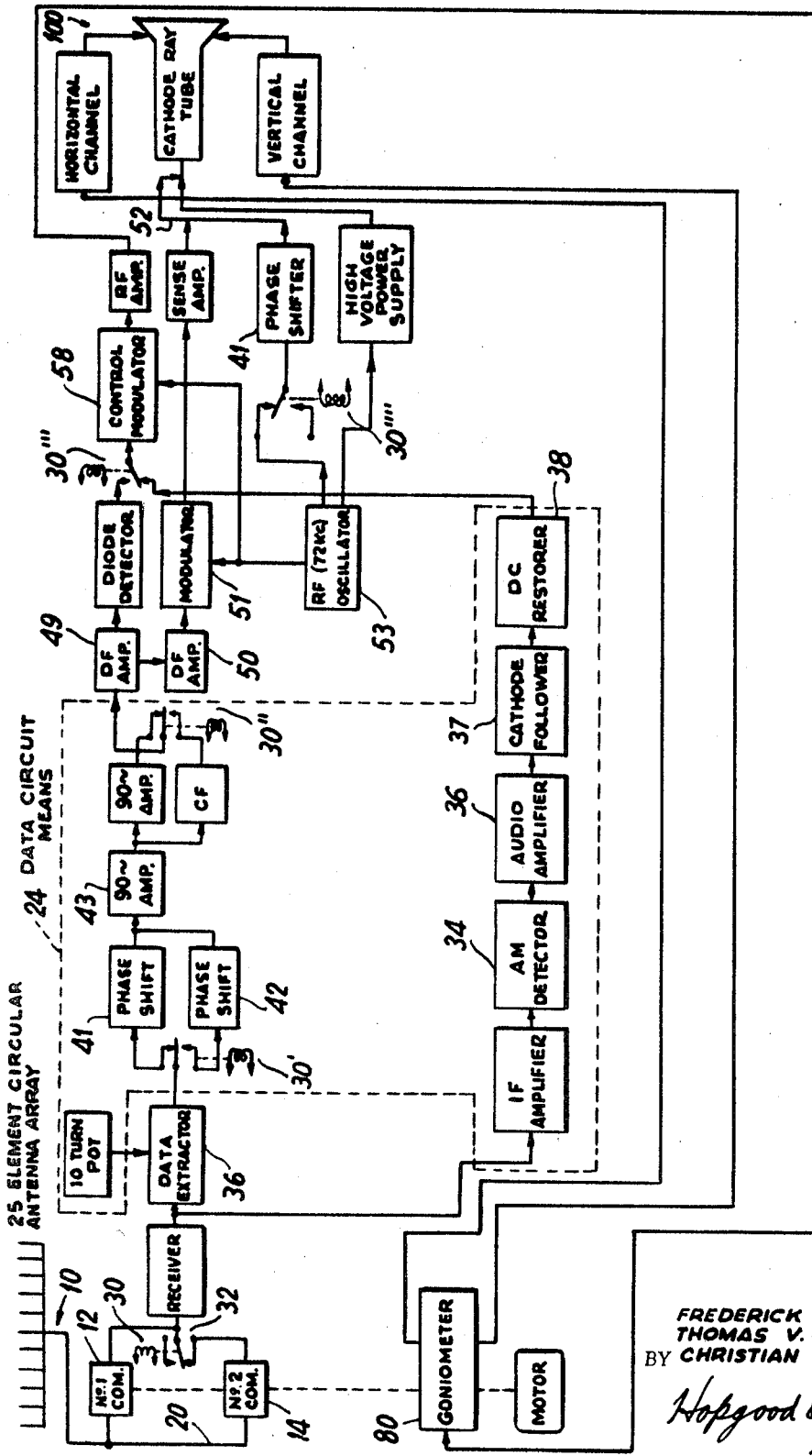
FIGURE 2 is a block diagram of the amplitude mode Doppler direction finder of this invention.

Referring now to FIGURE 2, a block diagram of the basic amplitude mode using the Doppler antenna array of a plurality of antennas 10 is shown. There is shown a dual commutator 12 and 14 where each commutator provides one rotor pickup coil. The individual antenna elements of the array are parallel connected to their respective inputs of the two commutators (antenna 1 to commutator 12 input 1 and commutator 14 input 1, antenna 2 to commutator 12 input 2 and commutator 14 input 2, etc.) and are sequentially scanned by the two commutator rotors. Specifically, the antenna array may comprise twenty-five monopoles equally spaced about the circumference of a 150 foot diameter circle. Output of the dual commutator is differentially connected into the input of receiver 22 when relay 30 places contact 32 in the down position. The IF output of the receiver is connected to data circuit means 24 having the amplitude modulation detector 34 and the Doppler data extractor 36. Outputs of the AM detector, and the data extractor are coupled to the azimuth indicator 100 for bearing and blanking functions respectively. When contact 32 is in the up position, the device operates substantially as a conventional Doppler direction finder.

Dual commutator

A dual commutator provides flexibility in changing rotor spacings, although two separate pickup rotors on a single stator provides the same effect for a fixed rotor spacing. Further, a manual differential as suggested in FIGURE 3 may be used to controllably vary the rotor spacing. In FIGURE 3, gears 61, 61A are coupled to respective rotors. A hand wheel coupled to gear 60 causes a change in the position of the pickup device via gear 61, and a similarly coupled gear 61A coupled on the shaft as gear 60 causes the position of the pickup means of the other rotor to vary in the other direction via gear 61A.

The rotor spacing for amplitude mode operation is obtained by rotating the stators of the two commutators half the required angle in opposite directions. Thus, if a 30° spacing is required, each commutator is rotated 15° as shown in FIGURE 4. Both commutators scan the antenna array in the same direction.

Amplitude mode operation is obtained by differencing the outputs of the two commutators which occurs when contact 32 is down. Since contact 32 is controlled by relay 30, a single single controlling relay 30 causes:

(a) Differencing of commutator outputs in the amplitude mode, and connections to the receiver input
(b) Switching to single commutator operation for normal Doppler mode, and connection to receiver input.

Relay operation is controlled by a switch accessible to the operator, which also operates relay 30', 30", 30''' and 30'''' (FIGURE 2).

Amplitude modulation detector

Figure 5:
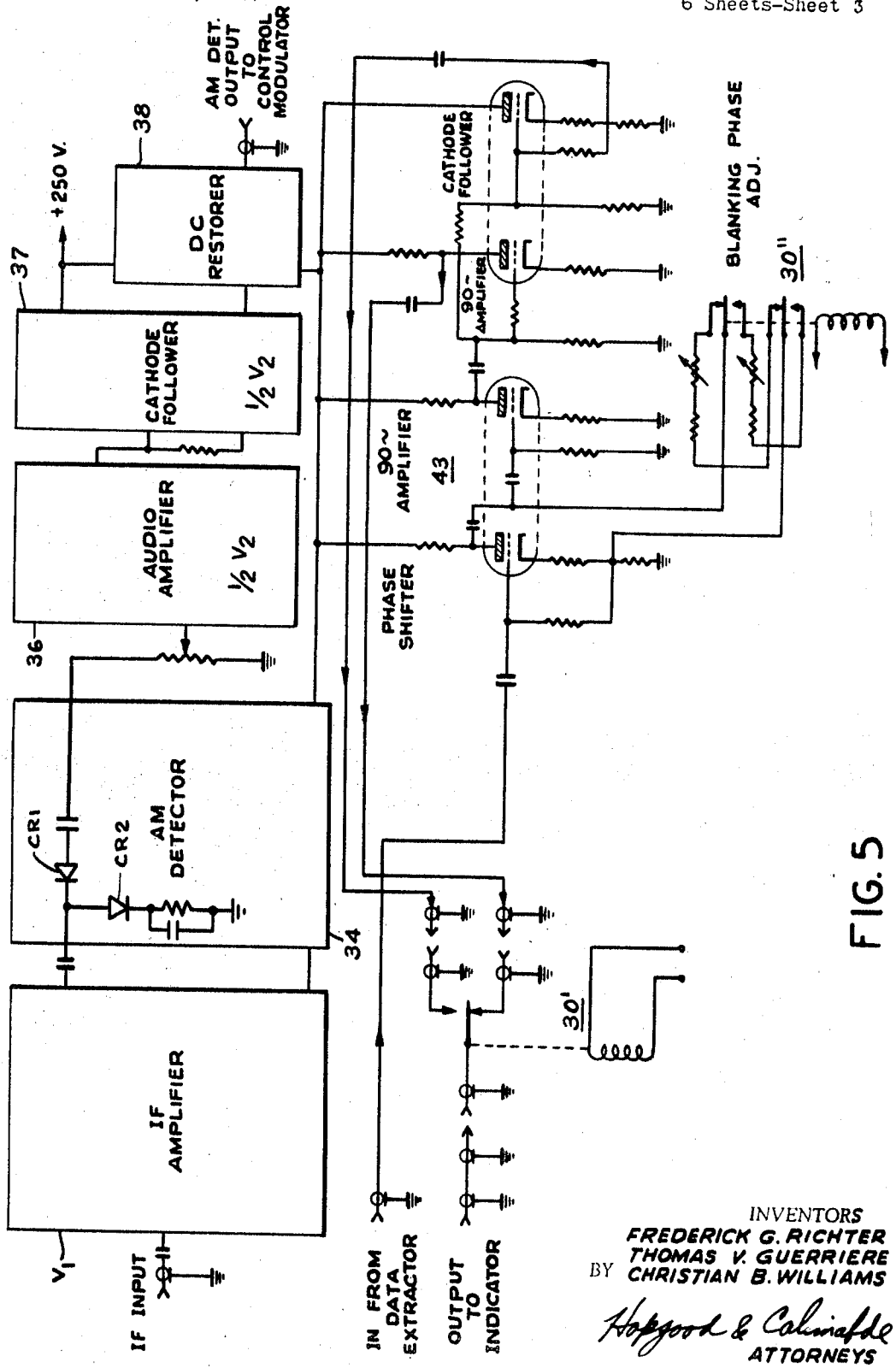
FIGURE 5 is a circuit diagram of the data circuit means of FIGURE 2.

FIGURE 5 is a schematic diagram of the amplitude modulation detector, which functions to detect the nulls on the carrier caused by the dual commutator. Output of the detector is coupled to the signal grid of the azimuth indicator control modulator, which in turn processes the bearing information for presentation on the cathode-ray tube.

$V_1$ is a tuned amplifier driving diode detector $CR_1$ and $CR_2$. The detected signal is amplified in the first half of $V_2$. The second half of $V_2$ is a cathode follower, which drives the grid of the control modulator 58 (FIGURE 2).

Since the grid of the control modulator is normally directly connected to the detector, a DC component exists on the grid. In the AM mode, the detector is isolated from the grid by an RC amplifier stage 36 and a cathode follower 37. This removes the DC component from the detected output. DC restorer 38 (FIGURE 2), necessary to make the amplitude mode display compatible with the Doppler indicator, is provided by parallel diode 39 (FIGURE 5).

Referring also to the FIGURE 2, additional phase shift 41, 42 circuits are provided to phase shift the Doppler data signal. Phase shift is required for AM mode operation to properly phase the blanking signal and in the Doppler mode to properly orient the bearing propeller. The two stages of $V_3$ provide amplification and phase shift for Doppler or AM mode of operation.

As the frequency of operation increases so that the electrical spacing of the two antennas scanned is one wavelength, additional nulls appear on the IF pattern derived at the output of receiver 22. This is due to the fact that at the sides of the array, the antennas are parallel to the direction of propagation of the signal. At one wavelength, the two antennas see the same phase signal and the resultant commutator differenced output is zero. The IF pattern shows almost the same signal as at the front and rear of the array where the two antennas also see the same signal phase.

To increase the useful operating frequency, the spacing of the rotor pickup coils can be reduced, thus eliminating the additional nulls. This the reason for the variable spacing as provided by means shown in FIGURE 3.

It has been found that the aperture of the system on the AM mode throughout the band of approximately 5.85 mc. to 20 mc. should be substantially $.9\lambda$, which is the same as saying that the effective spacing between antennas should be $.9\lambda$. This spacing is determined by the angular rotor spacing. As the frequency increases, $\lambda$ decreases, and the system aperture tends to increase beyond $1\lambda$ (the wavelength), which causes a plurality of nulls as mentioned. Therefore, the means of FIGURE 3 is used to continuously control and adjust the effect rotor spacing, particularly with changing frequency of operation.

Referring to FIGURE 2, in the bearing indicator 100, the basic reference signal is displayed on the cathode-ray tube as a rotating strobe line, which, due to its speed of rotation, appears as a filled-in circular pattern (in the absence of DF signal). The rotation of the strobe line is derived from goniometer 80 coupled to the motor shaft and is therefore angularly coincident to the basic reference signal. The strobe line is developed by a sweep signal (72 kc.) to the horizontal and vertical plates of the CRT. The 72-kc. signal is routed to the CRT plate through the goniometer stators.

The goniometer 80 is basically a rotating transformer which modulates the output as a function of the angle between primary (rotor) and secondary (stator). Two stator windings are physically displaced by 90°, therefore the peaks of the modulation envelope occur 90° apart on one stator with respect to the second stator. The outputs of the two stators are coupled to the horizontal and vertical plates of the CRT. Rotation of the goniometer causes coincident rotation of the strobe line which is synchronous to the system scan rate and produces a circular pattern on the face of the CRT. At any instant of rotation, the angle indicated by the strobe line is coincident with the angular position of the goniometer, and has a definite relationship to that of the commutators.

Since the display on the face of the CRT is generated from a straight line across the face of the tube which rotates at the scan rate, the trace with no DF signal reresults in a circular pattern for each one-half revolution. During the second half revolution, a second circular pattern is traced. With a DF signal modulating the deflection voltages, a propeller is generated for each half revolution instead of the circular pattern. Since the propeller generating wave form is derived by full wave rectifying the sinusoidal output of the Doppler data extractor, two cusps per revolution occur. Each cusp generates a propeller; therefore, for each scan revolution, two propellers are traced on the CRT.

Sense is required to remove the inherent ambiguity of the DF display. It will be recalled that the point of the DF propeller is formed by modulating at 58 the 72-kc. sweep signal with the DF "cusp" from detector 57. Since the modulator waveform inherently reproduces the "cusp" at both positive and negative halves of the 72-kc. sweep, the propeller point will be reproduced at both ends of the CRT strobe line, hence 180° ambiguity. In the AM mode sense is further complicated due to the inherent ambiguity of the DF signal generated by the antenna commutator pattern (a null is generated at the front and another at the rear of the array). Since the Doppler principle does not suffer from this problem, it may be automatically sensed, whereas the AM mode requires additional sense circuits to provide an unambiguous pattern.

Doppler mode

For illustrative purposes, a north arriving signal is assumed in FIGURES 7 and 9. The Doppler 90-cycle sine wave traces the one cycle for each revolution of the commutator. Due to the full-wave detection process, two points or "cusps" are generated for each cycle. The modulator now introduces a north propeller point and a south propeller point for each "cusp." Since there are two "cusps" per revolution, it follows that there are two north points and two south points per revolution, hence, two superimposed propellers per goniometer revolution. Further, the phase of the 72-kc. strobe line is reversed at each half revolution, since the goniometer rotor is aligned opposite at each complete half-revolution. Therefore, to blank the south half of the propeller, the 72-kc. blanking signal sent to the CRT grid must reverse phase every half revolution of the goniometer.

Figure 8:
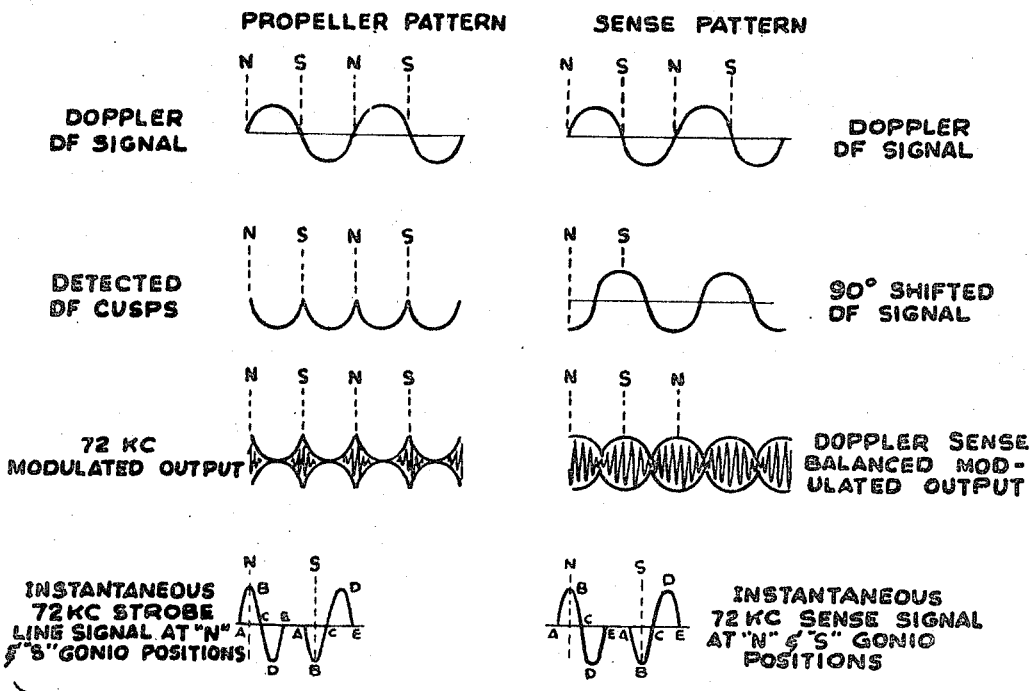

Referring to FIGURE 8 at first half revolution, the 72-kc. deflecting signal traces from A–B–C–D–E causing strobe line deflection from center to north to center to south to center; at second half revolution, the 72-kc. trace from A–B–C–D–E causes strobe line deflection from center to south to center to north to center, i.e., opposite to first half.

The 72-kc. blanking signal is phase reversed to blank the south half for each revolution by employing a balanced modulator (FIGURE 2) as will be explained in more detail later. Using the 90-cycle DF signal to modulate the 72-kc., the balanced modulator output inherently produces a carrier phase reversal for each half of the modulating sine wave.

Since the point of the DF propeller is formed by the zero crossover of the DF sine wave, the 90-cycle modulation to the sense balanced modulator must be shifted 90° in order to time the peak of the blanking signal envelope to the peak or point of the propeller signal envelope. Referring to FIGURE 8, the peak of the sense signal is positioned to coincide with the peak ("cusp") of the deflection signal. Also shown in FIGURE 8 are the phase relationships of the instantaneous 72-kc. deflection and sense signals for north and south gonio rotor positions. Since the CRT trace will be blanked by a negative going sense signal, it follows that in both north and south rotor positions, the south half of the trace is blanked (i.e. C–D–E for north and A–B–C for south) and the resulting pattern will be a half-propeller pointing north.

In the normal Doppler system, if the sine wave output of the data extractor has no distortion, the two propeller tips due to rectification are identical and overlay one another exactly, and appear as one. The other two tips are also overlayed but 180° displaced giving an ambiguous bearing. In this case the unrectified data signal is used to blank out the unwanted 180° propeller pair and a sensed "single propeller" pattern appears on the CRT.

It has been discovered that Doppler information is also present while using the array 10 in the amplitude mode. Blanking and continuous sense to remove the ambiguity is obtained by using the detected Doppler signal to blank the azimuth indicator.

In the AM mode, the modulating signal is obtained by detecting the modulation impressed on the IF by virtue of the directional characteristics of the array. The front null and the rear null each generate a propeller and again four tips appear upon the CRT. The data signal recovered from the data extractor is used to blank out one 180° pair of propeller tips. In this case, however, the front and rear nulls are not identical and the remaining overlayed pair are different and appear on the CRT as one sharp and one blunt propeller tip. The 72-kc. signal from oscillator 53 which generates the trace can be used to blank out the blunt pattern by adding this signal to the grid of the CRT in the proper phase. Since it changes phase every 180°, it extinguishes the blunt propeller and brightens the sharp one.

FIGURE 9 shows the development of the DF signal for the AM mode. A 30° rotor spacing is represented in 4(a) resulting in the IF envelope of (b) and the detected cusp waveform of (c). Since each cusp reproduces both north and south propeller points due to the CRT pattern generated, the broad rear null produces the pattern shown at (d) while the sharp front null produces the pattern shown at (e). Superimposing the two over a full gonio rotation produces the double pattern shown at (f). Since it is desired to show only the north half of the sharp front null pattern, a combination of Adcock and Doppler sense must be employed. Adcock sense utilizes an unmodulated 72-kc. signal in phase with the oscillator signal resulting in a half strobe line. Examination of the phase relationships of the 72-kc. deflection and sense signals at an instantaneous north and south gonio position shows that at north, the south half is blanked while at south, the north half is blanked (C–D–E in both cases). Since the illustrated case of FIGURE 9 traces a sharp point at north position and a broad point at south position, the resultant pattern after Adcock blanking is shown at 9g (i.e. the reverse half at each position is blanked). Now in order to blank out the remaining ambiguous south half, Doppler blanking is added resulting in the pattern shown at FIGURE 9. An expanded view of the pattern is shown in FIGURE 10.

Summarizing briefly, bearing ambiguity due to the full indicator strobe line can be removed by a simple 72-kc. signal phased to blank the ambiguous half of the 72-kc. strobe line, but ambiguity due to the antenna patterns must be blanked by a signal, phase coincident to the antenna patterns (hence Doppler blanking).

The manner by which a direction indication and sense blanking achieved may be understood by referring again to FIGURE 2. Here conventional Doppler direction finder operates when relay K3, 30''', is in the illustrated up position. The output from the DF amplifier is applied to the diode detector. The diode detector detects a sine wave signal and converts it to a full wave rectified DC signal which is applied to the control modulator 58. The carrier to the control modulator 58 is obtained from oscillator 53. The envelope as the output from modulator 58 is thus the DC signal from the diode detector. This signal is amplified at the RF amplifier and applied to the goniometer including the CRT. That is, from the RF amplifier, the signal is applied through the goniometer means 80 to be applied to the horizontal and vertical channels of the CRT.

In the particular embodiment shown, the high voltage for the cathode ray tube anode is also obtained from oscillator 53. The output from oscillator 53 is applied to the high power voltage supply, which may include a flyback transformer to provide a rectified high power output.

In the amplitude mode operation, additional assistance for sense blanking is required as mentioned previously. This additional blanking is applied through phase shifting circuit means and is used to assist in the blanking because the two propeller patterns are not symmetrical.

Since the original propeller pattern is not symmetrical in the amplitude mode version, the output from the phase shifter is added to the output from the sense amplifier. In the Doppler mode of operation both of these propeller patterns are the same and they overlap, assuming there is no distortion. So that while both of these propeller patterns are present, there is no need to take any action to cancel out either one.

This signal from the first DF amplifier 49 is split and is applied to a second amplifier 50 and to a second modulator 51 in order to obtain sense blanking. Here, the carrier is also obtained from oscillator 53. Modulator 51 is a balanced modulator and is used to obtain sense blanking. This sensing signal is amplified and is applied as a blanking voltage over conductor 52 to the cathode ray tube.

Prior to addition of the Doppler blanking signal, proper phase adjustment of the AM mode Doppler signal must be accomplished. The inherent Doppler signal of the AM mode IF signal has a phase relationship shown in (b) but due to phase delay in the Doppler filtering circuits a phase shift K is introduced, producing a recovered signal as shown in (c). In order to properly blank the ambiguous half propeller, the peak of the blanking signal, shown at (e), must be time-coincident with the peak of the AM mode "cusp." Therefore, a phase shift as shown at (d) and provided by 41 is introduced to the AM Doppler signal to shift the peaks coincident to the AM mode nulls (north and south in the illustrations). Since all the foregoing phase relationships remain constant regardless of bearing azimuth, once proper orientation is achieved for any given bearing, continuous automatic sense is provided for all bearings.

The phase shifting circuit 41 provides a signal which is added to the indicator to provide the 72-kc. blanking required to remove two of the four propeller tips obtained (corresponding to the rear nulls). This consists of a variable resistor and a capacitor. This additional phase shifted voltage is only switch in when the system is operated in the amplitude mode, and is only required because of the phase shift that exists between the AM data signal and the recovered Doppler.

Figure 6:
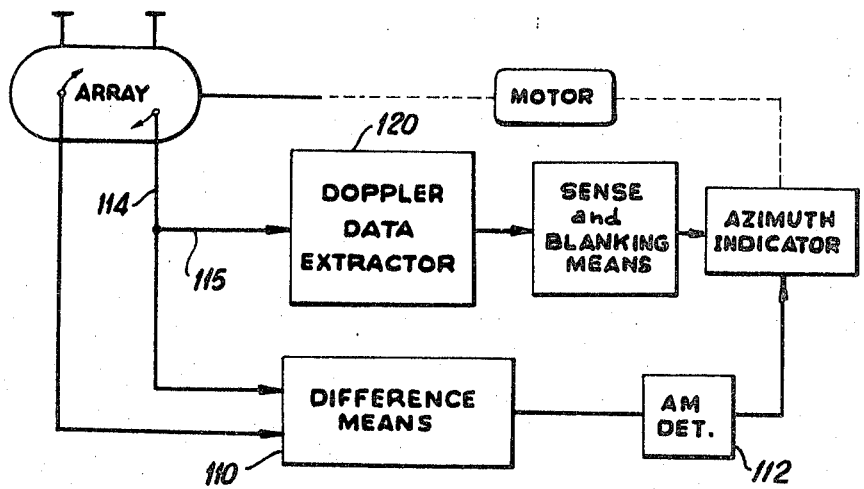
FIGURE 6 is a diagram of an alternate embodiment of this invention.

The system of FIGURE 6 is an alternate embodiment. Hence the array and the difference means 110 function in the same manner as in FIGURE 2. The AM detector 112 recovers the AM data signal to apply it to the azimuth indicator. However, one of the two antennas supplies directly over lines 114 and 115 a Doppler data signal to the extractor 120. The Doppler data signal is used to achieve sense as in the previous embodiment. Blanking and phase shift means operate in the same manner as that of FIGURE 2.

While the foregoing description sets forth the principles of the invention in connection with specific apparatus, it is to be understood that this description is made only by way of example and not as a limitation of the scope of the invention as set forth in the objects thereof and in the accompanying claims.

What is claimed is:
1. A Doppler direction finding system for determining the bearing of an incoming signal comprising
an array of antennas arranged in a circle,
first means for scanning the output from said antennas,
second means angularly spaced from said first means for scanning the output from said antennas,
said first and second means also providing simulated antenna rotation,
means for controllably adjusting the angular spacing between said first and second means,
means for comparing the two outputs from said first and second means and to detect the AM component from the output thereof,
means to utilize the said AM component to determine the bearing of the incoming signal.
2. The system of claim 1 in which the spacing between first and second means is continuously variably set to provide an effective aperture to the array of approximately .9λ with variations in frequency.
3. The sytem of claim 1 in which said comparing means continuously differences the two outputs.
4. The system of claim 1 in which said first and second means are each commutators and in which the respective rotors are angularly spaced.
5. The system of claim 1 in which said first and second scan means comprise a single rotor having a plurality of sensing means coupled thereto.

References Cited
UNITED STATES PATENTS
3,372,392  3/1968  Beukers _____ 343—113

RODNEY D. BENNETT, Jr., Primary Examiner

R. E. BERGER, Assistant Examiner